United States Patent [19]

Büchler

[11] Patent Number: 4,876,429

[45] Date of Patent: Oct. 24, 1989

[54] DEVICE FOR RETAINING TOOLS OR WORKPIECES HAVING A CYLINDRICAL SHAFT

[75] Inventor: René Büchler, Oberburen, Switzerland

[73] Assignee: Buchler B-Set AG, Flawil, Switzerland

[21] Appl. No.: 156,497

[22] Filed: Feb. 16, 1988

[30] Foreign Application Priority Data

Feb. 25, 1987 [DE] Fed. Rep. of Germany ....... 3706123

[51] Int. Cl.$^4$ ............................................... B23K 1/12
[52] U.S. Cl. ................................. 219/69.15; 219/69.1
[58] Field of Search ................... 219/69 R, 70, 69 E, 219/69 G, 69 D

[56] References Cited

U.S. PATENT DOCUMENTS 3,388,233  6/1968  Parrish, Jr. ...................... 219/69 E

FOREIGN PATENT DOCUMENTS 0205026 12/1982 Japan ................................. 219/69 E
0931341  5/1982 U.S.S.R. ............................. 219/69 E
0946875  7/1982 U.S.S.R. ............................. 219/69 E
1144818  3/1985 U.S.S.R. ............................. 219/69 E Primary Examiner—M. H. Paschall
Attorney, Agent, or Firm—Helfgott & Karas

[57] ABSTRACT

A coupling device for coupling, for example a shaft of a tool, to a coupling member anchored to a machine tool, comprises a take-up bushing formed with a conical recess receiving a substantially conical tapered sleeve which receives the shaft and is formed by at least two portions lying at two opposite sides relative to a central axis of the tapered sleeve. The sleeve is pressed into the bushing to retain the shaft in the coupling device.

14 Claims, 4 Drawing Sheets

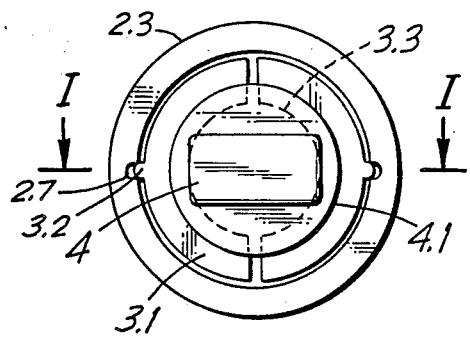
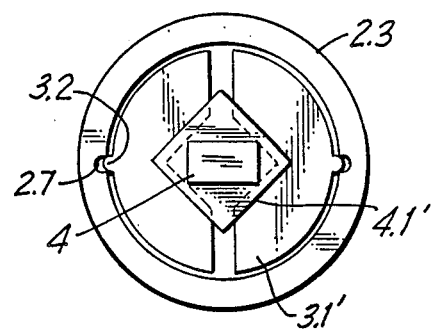
FIG.2  FIG.3
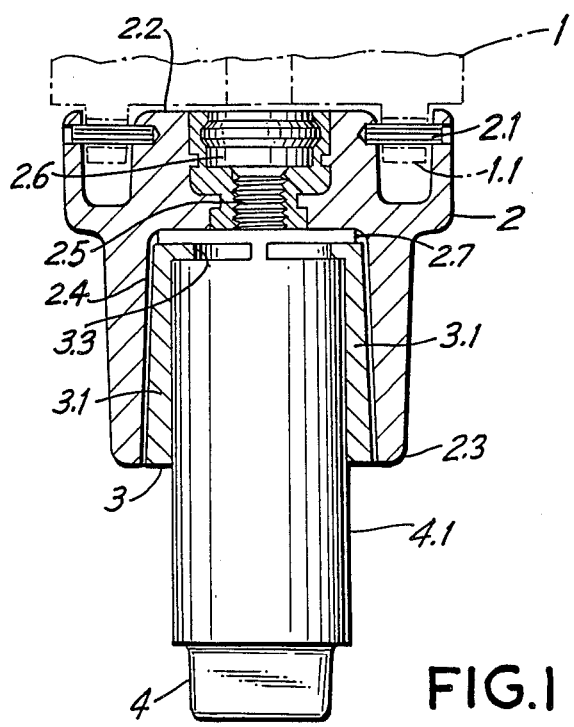
FIG.1

DEVICE FOR RETAINING TOOLS OR WORKPIECES HAVING A CYLINDRICAL SHAFT

FIELD OF THE INVENTION

The invention relates to a device for connecting a shaft to another member, especially for retaining a tool or workpiece including a shaft at a coupling member of a coupling the other coupling member of which is anchored at a machine tool, especially a die sinking erosion machine, the other member comprising a conical recess which converges in the direction from its mouth to a coupling face.

BACKGROUND OF THE INVENTION

Such a device is known from DE-AS No. 24 25 800. The device serves to hold an electrode of a spark erosion machine. In that case the other member or coupling member connected firmly to the spark erosion machine has a conical aperture into which is inserted a conical shaft of the member or a part to be retained. The conicities of shaft and coupling member must match as closely as possible. The coupling member further has a transverse opening through which passes a cross bar formed in turn with a central square opening. The conical shaft includes an axial projection with an enlargement which can be pushed through the square opening in the cross bar and locks the shaft at the cross bar after the shaft has been rotated through 90°.

The coupling member further has an external thread for cooperation with an internal thread formed in a cap screw. By a shoulder the cap screw presses elastic discs against the cross bar, thus pulling the cone of the shaft into the conical aperture. At the same time, the contact pressure acting on the cone is uncoupled somewhat from the tightening torque of the cap screw because of the elasticity of the discs. In addition a ring is fastened at the opening of the cap screw and comes to rest on an abutment shoulder of the coupling member so that the cap screw can be screwed only up to this stop. Upon loosening of the cap screw the latter ring acts against the cross bar, thereby pushing the conical shaft out of the conical aperture.

This known device is not suited to take up parts which have a different cross sectional shape. In particular the known device cannot establish connection with a cylindrical shaft.

In the case of another known fastening system cylindrical shafts may be used as tool holders or workpiece holders. With this system a die sinking electrode for spark erosion, at first having to be machined itself as a workpiece and then, upon being given its shape, becoming the tool, is fastened by soldering to the end face of a cylindrical shaft. The cylindrical shaft subsequently is placed in a chuck and, when its position with respect to the end face of the chuck has been fixed, both in height and in circumferential direction, the shaft is clamped in position by two pins one of which, protruding from the cylindrical shaft strikes against the end face of the chuck and at the same time against another pin which protrudes axially from the end face. Together with the shaft connected by soldering and acting as a handling aid, the future sinking electrode passes through all the machining steps and, when it has been completed, it is used by the same shaft as the sinking electrode in a die sinking erosion machine.

This solution has the disadvantage of involving expensive soldering of the workpiece or tool on the cylindrical shaft. Besides, not all materials are suitable for soldering. The round shaft entering the chuck furthermore restricts the possibilities of combination upon coupling to the erosion machine. In the case of bigger shaft diameters the parts including the shaft and the tool or workpiece become bulky, heavy, and expensive, and it also becomes difficult to store them for future machining.

SUMMARY OF THE INVENTION

Starting from the device mentioned initially, the instant invention has for its object to develop the known device such that it will be suitable to take up also those shafts which have a non-conical configuration.

This object is met, in accordance with the invention, in a device of the kind in question in that a divided taper sleeve is provided which has its outer surface adapted to the conical outline of the shaft.

The device according to the invention designed in particular as an integrating component of a coupling member affords improved stability, as compared to the known fastening system, by virtue of the more favorable ratio between the coupling face as the base area and the free shaft length. This permits the workpieces or the tools thus held to be machined or to effect types of machining work which involves strong forces, such as occur in turning.

These machining procedures carried out under the influence of great forces also lead to heating of the tool or workpiece. With the invention that cannot result in any separation from the shaft as there is no solder connection.

The combination of the device according to the invention with the type of coupling described further affords the opportunity of indexing the article held at the shaft, i.e. of obtaining precise, predetermined alignment between the shaft and the coupling member as regards rotation about the longitudinal axis of the shaft into different rotational positions. In this case, of course, a reference mark may be provided.

The divided taper sleeves allow shafts of different diameters to be press fitted and retained in the slightly conically converging recess of the take-up bushings, in the manner of a self-locking Morse taper. The taper sleeves may be made by pressure casting a metallic material, preferably aluminum or by injection molding a suitable plastic material; this can be done quickly and without any need for subsequent machining so that the parts may be inexpensive disposable articles. The device according to the invention likewise permits automatic handling of the retaining shafts including the respective object fixed to them.

BRIEF DESCRIPTION OF THE DRAWING

The invention will be described further, by way of example, with reference to the accompanying drawing, in which:

FIG. 1 is an axial sectional elevation of a device according to the invention projected in plane I-I of FIG. 2;

FIG. 2 is a view from below of the device shown in FIG. 1, a two-part taper sleeve with a circular cylindrical interior being inserted in the conical bore of the take-up bushing;

FIG. 3 is a view similar to FIG. 2 but showing the interior of the two-part taper sleeve to have a square cross section;

DESCRIPTION OF THE PREFERRED EMBODIMENTS

Figure 4:
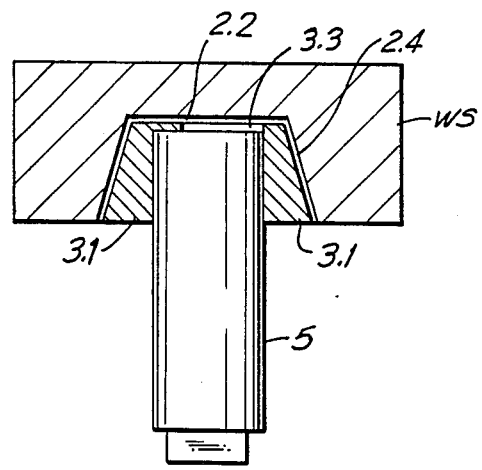
FIG. 4 shows an axial section of the device according to the invention with a tool fixed to a shaft.

The upper part of FIG. 1 is a diagrammatic presentation of the coupling mentioned above according to Swiss patent application No. 04 043/86-8. The coupling member 1 indicated by dash-dot lines at the top is anchored firmly at a die sinking erosion machine (not shown). It comprises transmission elements 1.1 of limited elastic deformability and each engaged by a rigid profiled element in the form of a cylindrical pin 2.1 provided at the coupling member 2 which is shown by continuous lines at the bottom. Relative movement between the two coupling members 1,2 in the main directions x, y, and z in spaces is prevented, as described in greater detail in the cited Swiss patent application.

The lower coupling member 2 which can be handled freely when not coupled is formed integrally with a take-up bushing 2.3 at the side remote from the coupling face 2.2. The take-up bushing 2.3 includes a bore or recess 2.4 which is open towards the free end of the bush and converges slightly conically in the direction of the coupling face 2.2. A threaded bore 2.5 is formed in the bottom of the take-up bushing 2.3 facing the coupling face 2.2 and so as to be coaxial with the conical recess 2.4. In FIG. 1 a greater cylindrical bore 2.6 is seen following the threaded bore 2.5. While the greater cylindrical bore 2.6 serves to take up a per se known device which effects the mutual clamping of the two coupling members 1,2 with respect to each other, the threaded bore 2.5 is provided for an auxiliary tool which will be described in greater detail below. For reasons of clarity the clamping device and auxiliary tool are not illustrated in FIG. 1.

A taper sleeve 3 composed of two halves 3.1 is pressed into the conically tapering recess 2.4 of the take-up bushing 2.3. The two halves are of such configuration that together they present an outer surface which has the same conicity as the recess 2.4, while the interior of the taper sleeve 3 is cylindrical and open at both ends. The shaft 4.1, likewise cylindrical, of a die sinking electrode 4 is clamped in the interior of the sleeve. The two halves 3.1 of the taper sleeve 3 include fins 3.2 protruding radially outwardly and extending in axial direction of the conical exterior. The fins 3.2 each engage in a groove 2.7 formed in the wall of the conical recess 2.4 to assure the positional symmetry of the halves 3.1 of the taper sleeve 3 (cf. FIGS. 2 and 3).

Those two fins allow indexing by 180°. The two fins may be replaced by three, four, or more fins, whereby indexing by 120°, 90°, etc. becomes possible.

With the assistance of the taper sleeve 3 acting in the manner of clamping tongues, the cooperating conical surfaces of the taper sleeve 3 and of the recess 2.4 formed in the take-up bushing 2.3 act to retain the shaft 4.1 of the die sinking electrode 4, in a fashion similar to a selflocking Morse taper. The mode of presentation in FIGS. 1 to 3 showing gaps between the lines of the cuts was chosen for purposes of better illustration; in reality the faces are pressed closely against each other.

A circular opening 3.3 coaxial with the cylindrical interior of the taper sleeve 3 is formed in the bottom of the taper sleeve which bottom touches the end face of the respective shaft 4.1 as the taper sleeve is pushed on the end of the shaft. The diameter of the circular opening 3.3 is smaller than that of the interior. The circular opening 3.3 may be used to press an auxiliary tool which can be screwed into the the threaded bore 2.5 in the bottom of the take-up bushing 2.3 facing the coupling face 2.2 against the adjacent end face of the shaft 4.1. so as to remove the shaft from its retention.

The take-up bushing 2.3 preferably is made by pressure casting a metal, preferably aluminum, forming the same integrally with the lower coupling member 2. The taper sleeve on the other hand preferably likewise is made by pressure casting a metallic material, preferably again aluminum or by injection molding a plastic material. This permits quick and precise manufacture of the parts of the taper sleeve 3 at little expenditure, making them inexpensive disposable articles which require no subsequent machining.

The selection of taper sleeves 3 of different inner diameters makes it possible to retain electrodes or other tools or workpieces, regardless of the diameter of the cylindrical shafts thereof.

The members of the retaining device shown in FIG. 3 are identical with those of FIGS. 1 and 2 and marked by the same reference numerals, with the exception of shaft 4.1' and the correspondingly shaped interior of the taper sleeve 3' which is composed of halves 3.1'.

FIG. 4 shows how a workpiece WS is secured to a shaft 5. The workpiece has a conical blind bore 2.4 which tapers inwardly. The bottom of the blind bore serves as an abutment face 2.2. The connection once more is established by a taper sleeve consisting of two halves 3.1 and likewise having a circular opening 3.3 in the bottom. To separate the workpiece WS and the shaft 5, a bolt may be threaded through a corresponding bore (not shown) to apply the axial force needed for separation.

Figure 5:
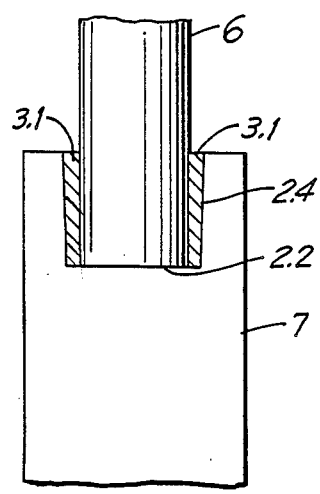
FIG. 5 shows an axial section of the device according to the invention illustrating the mutual fastening of two shaftlike parts.

FIG. 5 shows how the device according to the invention may be used also for connecting two shafts 6 and 7. One of the shafts 7 has a greater diameter than the other one 6 and moreover is formed with a conical blind bore 2.4 the planar bottom of which is designed as an abutment face. The connection again is established through a taper sleeve made of two halves 3.1 in accordance with the other embodiments of the invention. However, in this case the taper sleeve has no bottom so that the front end of the shaft 6 comes to a stop directly on the abutment face 2.2 of the other shaft 7.

Figure 6:
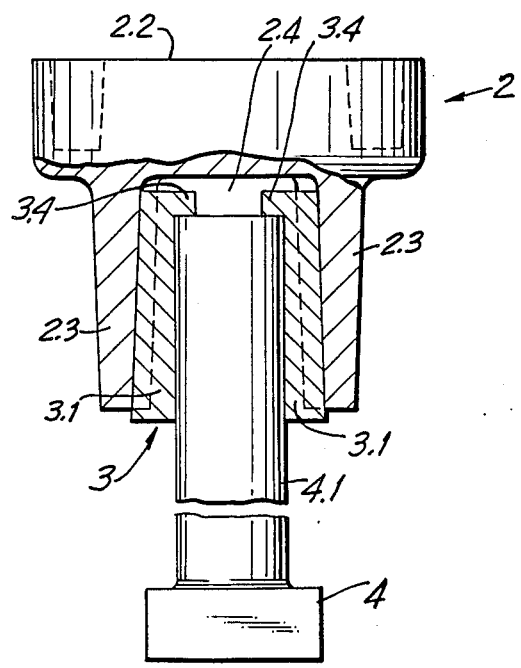
FIG. 6 shows an axial section of the device according to the invention illustrating another variant of the invention.

FIG. 6 shows an axial section of the device according to the invention similar to FIG. 1. Other than shown in FIG. 1, however, the coupling member 2 has a take-up bushing 2.3 in the form of merely two spaced apart webs which are located opposite each other and have their opposing walls extend at an acute angle so as to form a cone. As may be gathered from FIG. 7, the edge portions of these webs are limited by stops 2.8 extending perpendicularly to the webs. The taper sleeve 3 used here is in the form of two wedges 3.1 having their outside face adapted to the inclination or taper of the webs of the take-up bushing 2.3 and their inside face adapted to the shape of the shaft 4.1. In the case of the embodiment shown in FIGS. 6 and 7 the shaft 4.1 is rectangular. Those portions of the wedges 3.1 located in the range of the end of the shaft 4.1 have two stops 3.4 which are directed inwardly and thus to the other wedge and on which the end face of the shaft 4.1 comes to rest.

Figure 7:
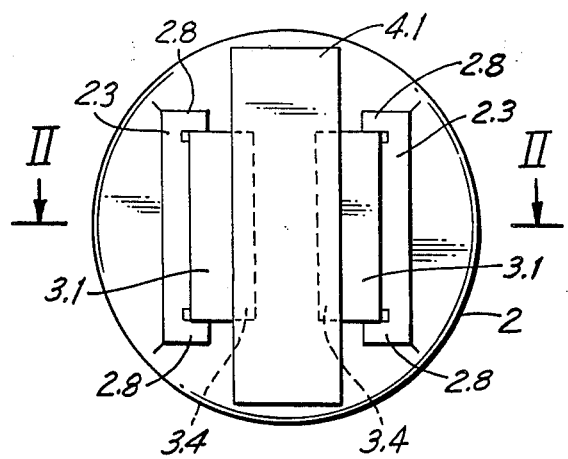
FIG. 7 is a view from below of the device shown in FIG. 6, showing the shaft to be rectangular and the two-part taper sleeve of wedge shape.

FIG. 7 shows the device of FIG. 6 as seen from below, and FIG. 6 presents a cut along line II—II of FIG. 7.

Figure 8:
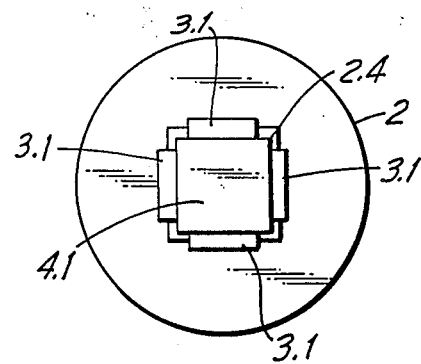
FIG. 8 is a view similar to FIG. 7 but showing a four-part taper sleeve and a rectangular conical aperture.

With another embodiment of the invention, presented in fig. 8, both the shaft 4.1 and the recess 2.4 have a square cross section. The respective opposed sidewalls of the recess are inclined with respect to each other at an acute angle, thereby presenting conicity. The taper sleeve consists of four wedges 3.1 which otherwise may be designed like those shown in FIGS. 6 and 7.

Figure 9:
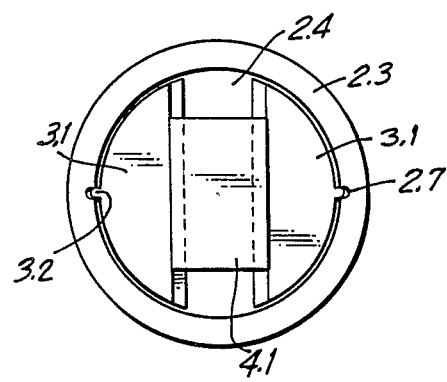
FIG. 9 is a view similar to FIG. 7 and showing a rectangular shaft, two-part divided taper sleeve, and circular conical bore.

Another variant of the invention is shown in FIG. 9. In a manner similar to that of FIGS. 1 and 2 the conical recess 2.4 is of circular cross section, while the shaft 4.1 again has a rectangular cross section. The taper sleeve is made of two frustoconical segments, the outer surface which is curved in axial direction being slightly tapered conically, while the cut surface facing the shaft 4.1 is parallel to the axis. Accordingly, the cross section of the halves 3.1 of the taper sleeve presents a circular section (segment of a circle). As with FIG. 2, the take-up bushing 2.3 is formed with two opposed grooves 2.7 and the outer surface of the halves 3.1 of the taper sleeve with projecting fins 3.2 to assure centering, guidance, and alignment.

What is claimed is:

1. A coupling device for connecting a shaft of one member, particularly of a tool or a workpiece, to another member, particularly a machine tool of a die sinking erosion machine, the coupling device comprising a first coupling member receiving said shaft and a second coupling member which is anchored to said another member, said second coupling member including a conical recess which converges in a direction from a mouth thereof toward a coupling face between said first and second coupling member, said first coupling member including a taper sleeve subdivided along a periphery thereof into at least two portions engaging in assembly said shaft, said taper sleeve having an outer conical surface adapted to the conical recess of said second coupling member and an interior adapted to an outline of said shaft whereby when said taper sleeve is pressed into said second coupling member, said outer conical surface cooperates with said recess to retain said shaft in the coupling device.

2. The device as claimed in claim 1, wherein said second coupling member is a take-up bushing coupled to said another member anchored at the machine, at the side of the second coupling member remote from the coupling face, and said taper sleeve includes a cylindrical interior, open at both ends, for insertion thereinto of an end of the shaft of the respective tool or workpiece, said end thus being adapted to be pressed together with the taper sleeve into said recess.

3. The device as claimed in claim 2, wherein a central circular opening is provided in a bottom of the taper sleeve, the diameter of the opening being smaller than that of the cylindrical interior of the taper sleeve.

4. The device as claimed in claim 2, wherein the taper sleeve is subdivided into two halves by an axial cut.

5. The device as claimed in claim 2, wherein radially projecting fins are provided at the outer conical surface of the taper sleeve for engagement in associated grooves formed in the conical recess.

6. The device as claimed in claim 1, wherein the interior of the taper sleeve has a polygonal cross section.

7. The device as claimed in claim 3, wherein a threaded bore is formed in a bottom of the take-up bushing facing the coupling face, said threaded bore being coaxial with the conical recess, the diameter of said threaded bore being smaller than that of the central circular opening in the bottom of the taper sleeve.

8. The device as claimed in claim 7, wherein the threaded bore in the bottom facing the coupling face of the take-up bushing has a cross sectional area which is smaller than the cross sectional area of the interior of the taper sleeve.

9. The device as claimed in claim 8, wherein the taper sleeve is combined of at least two pressed metal parts each of the shape of a sector of a cone.

10. The device as claimed in claim 1, wherein said conical recess in the second coupling member is defined by two opposed planar walls extending at an acute angle with respect to each other, and the taper sleeve is made of two wedges.

11. The device as claimed in claim 6, wherein the conical recess has a square cross section, and the taper sleeve is made of four wedges.

12. The device as claimed in claim 1, wherein the conical recess has a circular cross section, the shaft having a rectangular cross section, and said portions of the taper sleeve each having in cross section the shape of a segment of a circle.

13. The device as claimed in claim 1, wherein said at least two sleeve portions are positioned opposite one another relative to a central axis of said taper sleeve.

14. The device as claimed in claim 8, wherein the taper sleeve is combined of at least two injection molded plastic parts each of the shape of a sector of a cone.

* * * * *